US006775777B2

(12) United States Patent  
Bailey (10) Patent No.: US 6,775,777 B2  
(45) Date of Patent: Aug. 10, 2004

(54) SECURE SYSTEM USING IMAGES OF ONLY PART OF A BODY AS THE KEY WHERE THE PART HAS CONTINUOUSLY-CHANGING FEATURES

(75) Inventor: Kenneth S. Bailey, Huntington Beach, CA (US)

(73) Assignee: Ecryp, Inc., Los Angeles, CA (US)

( * ) Notice: Subject to any disclaimer, the term of this patent is extended or adjusted under 35 U.S.C. 154(b) by 708 days.

(21) Appl. No.: 09/771,496

(22) Filed: Jan. 26, 2001

(65) Prior Publication Data

US 2001/0004231 A1 Jun. 21, 2001

Related U.S. Application Data

(63) Continuation of application No. 09/676,174, filed on Sep. 29, 2000, now Pat. No. 6,405,314, which is a continuation of application No. 09/208,283, filed on Dec. 8, 1998, now Pat. No. 6,175,923.

(51) Int. Cl.[7] .............................................. G06F 1/24
(52) U.S. Cl. ...................................... 713/186; 713/170
(58) Field of Search ................................ 713/186, 170; 382/115, 124

(56) References Cited

U.S. PATENT DOCUMENTS

| 4,123,747 A | 10/1978 | Lancto et al. ............... 713/185 |
| 4,621,334 A | 11/1986 | Garcia ........................ 382/115 |
| 4,998,279 A | 3/1991 | Weiss |
| 5,067,162 A * | 11/1991 | Driscoll, Jr. et al. ........ 382/126 |
| 5,280,527 A * | 1/1994 | Gullman et al. ............ 713/184 |
| 5,420,924 A * | 5/1995 | Berson et al. ............... 713/186 |
| 5,508,978 A | 4/1996 | Kalbermatter et al. |
| 5,557,665 A | 9/1996 | Yamamoto ................... 379/198 |
| 5,572,597 A * | 11/1996 | Chang et al. ............... 382/125 |
| 5,613,012 A | 3/1997 | Hoffman et al. ............ 382/115 |
| 5,745,555 A | 4/1998 | Mark ....................... 379/93.03 |
| 5,787,154 A | 7/1998 | Hazra et al. ............... 379/9.03 |
| 5,805,686 A | 9/1998 | Moller et al. ............... 379/198 |
| 5,805,719 A | 9/1998 | Pare, Jr. et al. |
| 5,815,252 A * | 9/1998 | Price-Francis ............... 356/71 |
| 5,825,871 A | 10/1998 | Mark ......................... 379/355 |
| 5,838,812 A | 11/1998 | Pare, Jr. et al. ............. 382/115 |
| 5,864,613 A | 1/1999 | Flood ........................ 379/188 |
| 5,872,834 A | 2/1999 | Teitelbaum ............... 379/93.03 |
| 5,887,140 A * | 3/1999 | Itsumi et al. ............... 709/225 |
| 5,907,597 A | 5/1999 | Mark ....................... 379/93.03 |
| 5,982,913 A * | 11/1999 | Brumbley et al. .......... 382/124 |
| 6,002,784 A * | 12/1999 | Sato ........................... 382/124 |
| 6,005,963 A * | 12/1999 | Bolle et al. ................. 382/124 |
| 6,031,942 A * | 2/2000 | Nakayama .................. 382/284 |
| 6,075,876 A * | 6/2000 | Draganoff ................... 382/124 |

* cited by examiner

Primary Examiner—Thomas R. Peeso  
(74) Attorney, Agent, or Firm—Fish & Richardson P.C.

(57) ABSTRACT

A secure system using a continuously-changing key that depends on the user's body part. A preferred embodiment obtains an image of the user's fingerprint and cements it according to a random generator. Only part of the image and not all of the image is sent at one time. The random segmentation insures that part of the image that is sent continuously varies from time to time. Therefore, an unauthorized receiver can receive only part but not all of the image. That only part of the image which is received will usually not be the same at the second as it is at the first time. Therefore, a received code cannot later be used to fool the system with the same credit card.

117 Claims, 5 Drawing Sheets

SECURE SYSTEM USING IMAGES OF ONLY PART OF A BODY AS THE KEY WHERE THE PART HAS CONTINUOUSLY-CHANGING FEATURES

This is a continuation of U.S. application Ser. No. 09/676,174, filed Sep. 29, 2000 (issued) now U.S. Pat. No. 6,405,314, which is a continuation of U.S. application Ser. No. 09/208,283, filed Dec. 8, 1998 (issued) now U.S. Pat. No. 6,175,923.

FIELD OF THE INVENTION

The present system relates to a secured transaction key that is secured by reference to part, but not all of, a user's body part.

BACKGROUND OF THE INVENTION

Credit card transaction fraud is an expensive problem. Prevention of such fraud requires making sure that the credit card is not stolen or used in an authorized way. Some credit cards, for example, put the user's photograph on the credit card. It has also been suggested to use a fingerprint or a retinal scan for identification.

This problem becomes more difficult when carried out over the Internet. A stolen credit card can easily be used over the Internet since the person does not need to appear in person. There is no clerk to compare the person using the card to the photograph on the card.

Fingerprints have been suggested as an effective way of verifying a user's identity. The central credit card validating company could include an image of the user's fingerprint. Relatively inexpensive fingerprints scanners are available. The user inserts a specified finger into the fingerprint scanner, and the scan from the user's finger would be sent along with the credit card information. This received fingerprint information would then be compared with fingerprint information within the database, prior to accepting the transaction.

Problems with fingerprint comparisons of this type include the difficulty of comparing an incoming fingerprint with a huge number of possibilities from which it could be compared and the bandwidth.

The science of fingerprints hence defines the fingerprints, nd segregate the fingerprints into distinct classes. The classes of patterns currently used includes loops, whorls, and arches. Approximately sixty-five percent of the patterns are loops, thirty percent are whorls and approximately five percent are arches. Fingerprints are typically described in symbolic representation of alphanumeric clusters that define what is observed in the print itself in the terms of the loops, whorls, and clusters. Positive and absolute identification on the Internet or in any remote location becomes a difficult problem. A perpetrator of Internet access fraud often is very clever about the way that they carry out the fraud. For example, these people often use sophisticated systems to intercept information, including persons' passwords and personal access numbers. Therefore, if a user sends an image of his fingerprint, the hacker could intercept that image and later use the intercepted image to perpetrate a fraud.

In addition, sending an entire image is a bandwidth-intensive operation. This operation could take many minutes, which could cause unacceptable delays.

It is possible, of course, to encrypt the entire image. However, this would require even more mathematical sophistication to the system.

SUMMARY

The present inventor recognized the desirability of using a constantly-changing personal access code on the Internet. Use of such a constantly-changing access code, of a type which is not able to be stored by a computer or calculated in any conventional manner, would be highly advantageous. In addition, the system should not be one which requires the user to memorize complicated information.

According to this system, a part of the user's body is used as the constantly-changing personal access code. However, rather than using the entirety of the image of the part of the user's body, this system selects only different portions of the image to send. The different portions of the image are calculated based on time and date stamps indicating when they are sent. Therefore, a hacker or unauthorized user who receives the information receives only a part of the information indicating the body part. No receiver gets enough information to reconstruct the entirety of the image. The unauthorized receiver therefore could not reuse the information at some later time, because that later time would have a different time stamp and would hence require different information.

Therefore, the unauthorized reception does the receiver virtually no good, since the unauthorized reception does not provide enough information to allow the receiver to reconstruct the information at some later time. It also does not give the receiver all the information about the fingerprint.

This system has another added advantage of allowing a reduction in the amount of information which is sent. This hence reduces the total needed bandwidth of the system, and reduces the amount of time that will be necessary for the operation.

In addition, the present system includes additional aspects, including an encryption key which adds further security to the system, and an additional aspect compensates for orientation of the fingerprint.

These and other aspects will now be described in detail with reference to the accompanying drawings, wherein:

DESCRIPTION OF THE PREFERRED EMBODIMENTS

Figure 1:
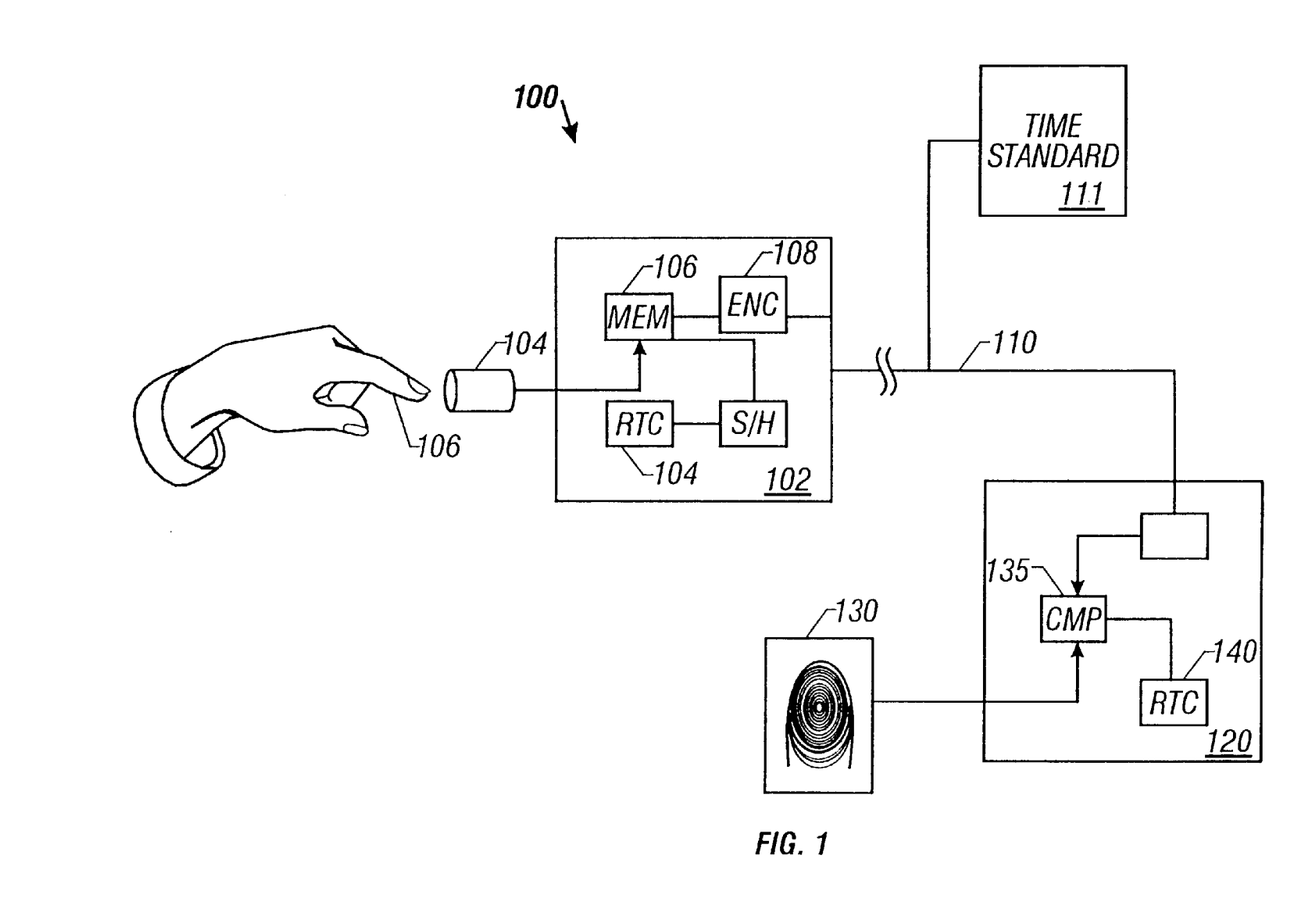
FIG. 1 shows a segmented fingerprint of the type preferably used according to the present system.

FIG. 1 shows a basic block diagram of the system. The remote premises 100 is typically the user's home or place of business. The remote premises includes a personal computer 102 and a fingerprint scanner 104. The user places their finger 106 into the fingerprint scanner, and the PC 102 controls the fingerprint scanner according to a prestored program in its memory. The fingerprint information is then sent over the telephone line 110 to the central computer 120. The central computer 120 includes a database memory 130 which includes a plurality of fingerprints stored therein. Each stored fingerprint preferably includes a digitized version of the entire fingerprint of any user who is authorized.

Figure 2:
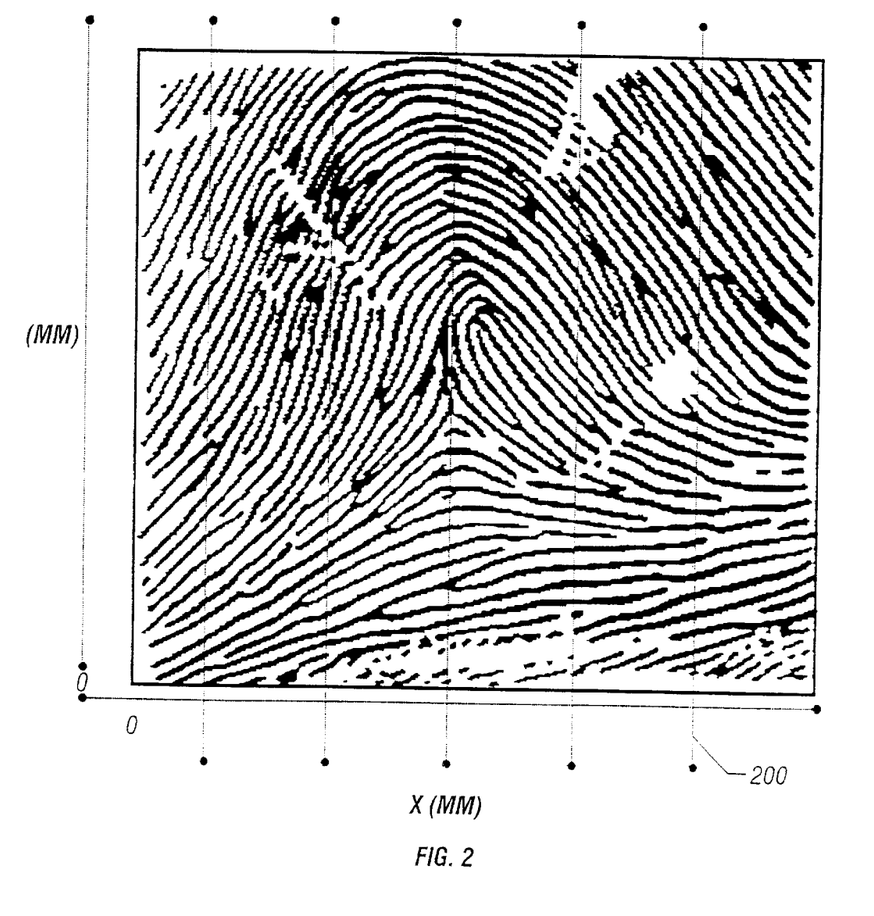
FIG. 2 shows a diagram of a fingerprint that is segmented in the way done according to the preferred mode of the present specification.
Figure 3:
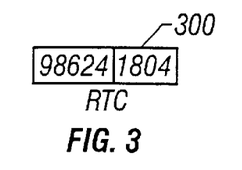
FIG. 3 shows a time and day stamp format.

FIG. 2 shows a sample fingerprint in its entirety set forth in a grid pattern. The segmentation processing as done according to the present invention is carried out according to the x,y grid also shown in FIG. 2. The x coordinate of the fingerprint is segmented to form lines such as 200. In this embodiment, the lines are formed at a constant pitches, but in other embodiments the lines could be formed at any random pitch. The pitch of the lines are selected according to the time and day stamp, which is effectively random. The local computer 102 includes a real-time clock 104, which produces a time and day stamp of the shown in FIG. 3. According to one embodiment, the day of the month is added to the hour of the day and the minutes, and the least two significant bits form the number of millimeters of pitch. Different techniques for selecting the distance between lines are also described herein.

The fingerprint scanner 104 obtains the entire image of the fingerprint and places it into working memory 106. The output from real-time clock 104 controls a sample-and-hold circuit which selectively reads columns of information out of the working memory 106. Each column corresponds to an n-pixel-wide sample along each of the x values shown in FIG. 2 where n is between 1 and 20. In the FIG. 2 embodiment, therefore, there are preferably five, 5-pixel-wide columns that are read out from the memory 106. These five columns are assembled into a message, and sent over the telephone line. The encryption block, shown as 108, provides further optional protection of the information prior to sending.

At the other end, the information 110 is received in the computer 120. The information received includes the packet sent by computer 102 which is of the form shown in FIG. 3. The portion 300 is the real-time clock information. In this embodiment, the clock information is shown showing Jun. 24, 1998, 6:04 p.m. (1804 in 24-hour time). As explained above, the simplistic algorithm given herein adds 24+18+4 to form 46 mm between the samples 200.

Figure 4:
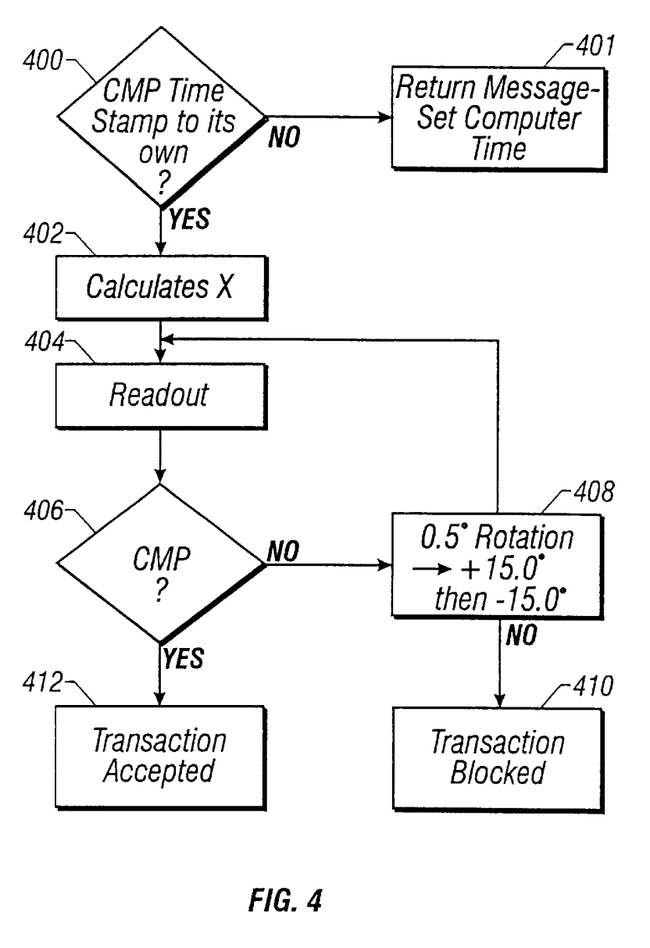
FIG. 4 shows a flowchart of operation of a first embodiment.
Figure 5:
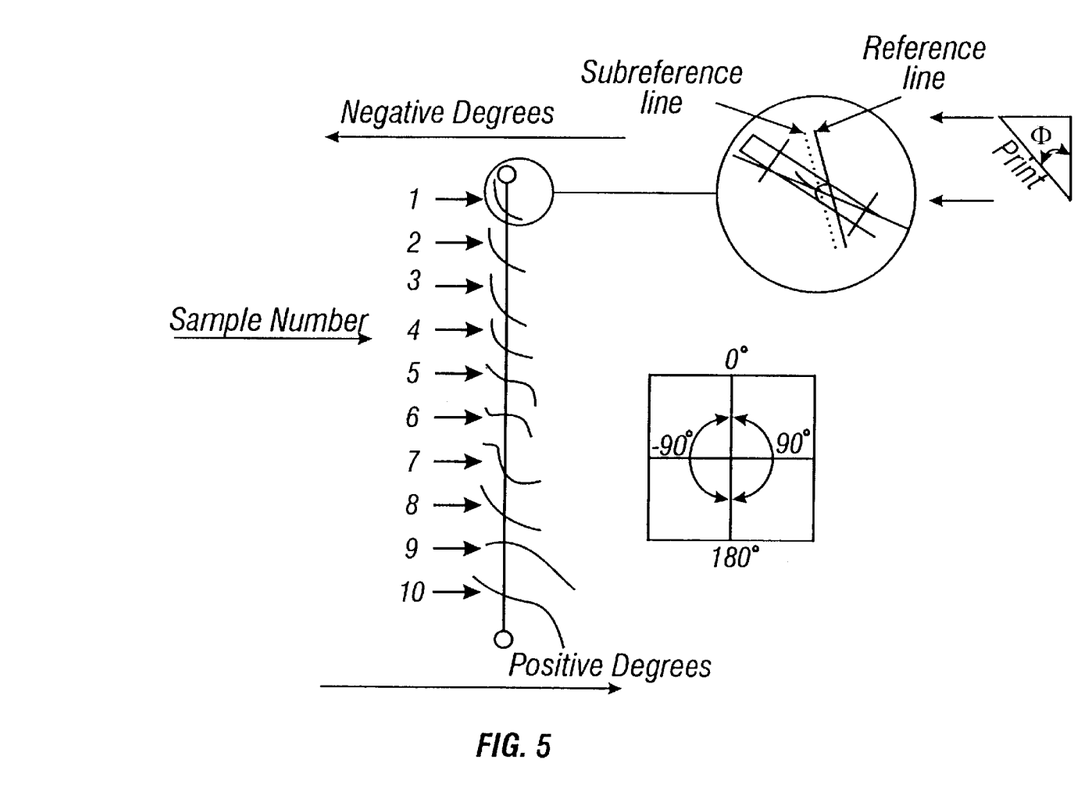
FIG. 5 shows a way in which a second embodiment obtains angle information.

The compare process 135 carries out the flowchart shown in FIG. 4 to determine accurately whether it should accept the information as being authorized.

First, at step 400, the compare process compares the time stamp to its own time stamp as stored in the real-time clock 140. The incoming time stamp is taken as being correct so long as it is within a predetermined threshold, e.g., 10 minutes of its own time stamp. If it is not, the system returns a message at 401 indicating to the PC 102 that it should set its time.

An alternative embodiment executes a routine in the PC to set the PC real time clock 104 using an internet-based time standard 111, prior to sending the fingerprint information. If this is done, the threshold at step 400 can be shortened, e.g. to one minute.

If the time stamp compare at step 400 is ok, flow passes to step 402 where the system calculates the x values. At step 404, the system reads out its own values from the database memory 130 storing the entirety of the user's fingerprint information. The two are compared at step 406. If the comparison indicates that the two are not the same, then a 0.5° rotation is carried out at step 408, followed by flow passing to step 404 for the information to be re-read with a rotation. This is done up to +15° and then to −15°. If none of these comparisons agree, the transaction is blocked at step 410. If the comparison is determined as agreeing at step 406, then the transaction is accepted at step 412.

The above has described one way of segmenting the date and time stamp. Another way, of course, is to simply segment the real-time clock into two-digit numbers. Any way of taking the date and time stamp and segmenting it such that it effectively forms random information could be used according to this embodiment.

Another way is to use the lowest-resolution two digits, unless they have been used within the past thirty days. This system would prevent re-use of the numbers, to ensure that the value is constantly changing, and that any attempt to re-use the same information would be blocked.

Figure 6:
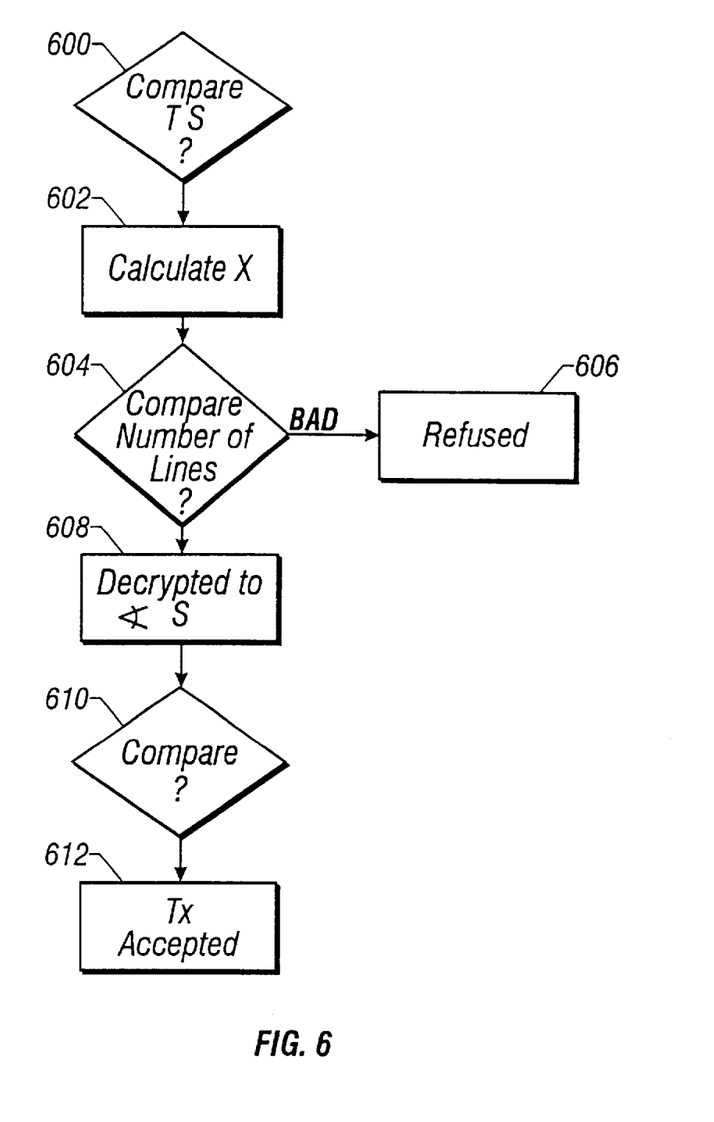
FIG. 6 shows a flowchart of operation of the second embodiment.

This second embodiment, therefore, uses a process in the computer 120 which operates according to the flow chart of FIG. 6. As in FIG. 4, step 600 compares the time stamp with its own to make sure that a bogus time stamp is not being sent. Again, x is calculated at step 602. At step 604, the system detects the number of lines which are received with the number of fingerprint data that cross the reference line in its own database. This information is an initial comparison, and importantly this information will not change based on tilt of the fingerprint. If this is bad at step 604, the operation is refused at step 606. At step 608, the incoming encrypted information is decrypted back to angles. This decrypted information then represents the various angles of the various lines. The comparison done at step 610 then compares the angle of each line with the angle of each line in its database. If correct, or if all angles differ by the same amount, the transaction is accepted at step 612. This system does not require rotation compensation, since the compare step 612 accepts the comparison even if all angles are wrong by the same amount. Hence, this system effectively built-in finaer tilt compensation.

Although only a few embodiments have been disclosed in detail above, modifications are possible while staying within the subject matter of the present claims. For example, while this embodiment describes specific ways of using the time and day stamp to form a constantly-changing indicia, other random ways of forming the indicia are also possible. An important feature is that the operation is constantly changing, and that a user's body part is used. In addition, similar operations could be carried out using retinal scans, or other print information so long as that print information is unique. All such modifications are intended to be encompassed within the following claims.

What is claimed is:

1. A method, comprising:
   obtaining information indicative of a biometric;
   forming multiple separated samples indicative of said biometric, said separated samples representing separate portions of information from the biometric which separated samples are separated from one another by a specified amount;
   controlling said forming according to a value which is effectively random, such that forming at two different times will form two different samples; and
   sending said multiple separated samples indicative of said biometric, and not all of the information indicative of the biometric, at any of said different times.

2. A method as in claim 1 wherein said biometric is a fingerprint.

3. A method as in claim 2, wherein said forming comprises defining sampling areas along said fingerprint which are separated from one another, and obtaining samples along said separated areas.

4. A method as in claim 1 further comprising obtaining a value indicative of a current time and day and adding said value prior to said sending.

5. A method as in claim 1, wherein said an effectively random value is based on at least one of time and/or date.

6. A method as in claim 5, wherein said effectively random value is based on both date and time.

7. A method as in claim 1, further comprising reading different parts of said biometric and storing said different parts, said different parts being separated by an amount based on said effectively random value.

8. A method as in claim 7, wherein said reading comprises obtaining a value of a specified size at each separated sample.

9. A method as in claim 1 wherein said biometric is a retinal scan.

10. A method as in claim 1, wherein said biometric is information which can be represented as an image.

11. A method as in claim 10, wherein said obtaining random parts comprises obtaining random parts of information indicative of the image.

12. A method as in claim 2 wherein said obtaining biometric part comprises using a fingerprint scanner to obtain an entire image of the fingerprint, and placing said entire image into a working memory.

13. A method as in claim 12, wherein said reading comprises reading out samples from said working memory based on said random value.

14. A method, comprising:
obtaining a value indicative of a biometric information;
converting said value into electronic information indicative of said biometric information;
obtaining a random value which is different at different times of operation, such that said random value at a first time is different then said random value at a second time; and
selecting a plurality of separated portions of said electronic information based on said random value.

15. A method as in claim 14 wherein said biometric information is a fingerprint, and said electronic information is information that is indicative of an image of said fingerprint.

16. A method as in claim 14, wherein said random value is used to segment electronic information into separated segments.

17. A method as in claim 15 wherein said effectively random number is used to form pitches between different separated portions of the image.

18. A method as in claim 14 wherein said effectively random value is based on an indicia of time.

19. A method as in claim 18 wherein said indicia of time includes a time of day.

20. A method as in claim 18, wherein said indicia of time includes a date.

21. A method as in claim 18, wherein said indicia includes both a time of day and a date.

22. A method as in claim 18, further comprising decoding, at a remote end, said plurality of separated portions, obtaining said random value, and comparing said random value to a current indicia to determine if said current indicia is close to an indicia represented by information in said random value.

23. A method as in claim 14, further comprising receiving said plurality of separated portions at a remote end, and verifying an identity based on said remote portions.

24. A method as in claim 14, further comprising compensating for a rotation of said fingerprint prior to sampling the information.

25. A method, comprising:
obtaining a constantly changing value which is different at a first time than it is at a second time;
using said value to select portions of a biometric information data set; and
sending information indicative of said portions and not information about at least a plurality of areas other than said portions, to a remote location as an identifying data set.

26. A method as in claim 25 wherein said biometric information data set includes biometric data indicative of a biometric scan.

27. A method as in claim 26 wherein said biometric scan is a scan, which can be represented as an image of a body part.

28. A method as in claim 27 wherein said body part is a fingerprint.

29. A method as in claim 27 wherein said body part is a retina.

30. A method as in claim 25 wherein said constantly changing value is a random number.

31. A method as in claim 30, wherein said random number is based on an indicia indicative of a current time and/or date.

32. A method as in claim 28 further comprising determining values indicating an angle represented by a portion of the fingerprint at said portions.

33. A method as in claim 25 further comprising, at the remote location, receiving said portions, determining, from a database in said remote locations, whether said portions correspond to specified information in its own database, and establishing an identification based on said determining.

34. A method as in claim 33 wherein said biometric information is a fingerprint.

35. A method as in claim 34 wherein said fingerprint information includes information indicative of an angle of the fingerprint portion along a specified line.

36. A system, comprising:
a biometric reader, which obtains data indicative of a biometric;
a first generator which obtains a constantly varying value;
a data sending element, which selects parts of said data, but does not select other parts of said data, based on said constantly varying value, and which only sends said parts, and does not send said other parts.

37. A system as in claim 36, wherein said biometric reader is a fingerprint scanner.

38. A system as in claim 37, further comprising a memory, storing information indicative of a whole fingerprint, and wherein said data sending element selects only some of the information in said memory for sending and does not send information other than said some.

39. A system as in claim 38, further comprising, at a remote end, a receiver receiving said information, which is sent.

40. A system as in claim 38 wherein said receiver includes a database with whole fingerprint information, indicative of a whole fingerprint, and compares said information with said whole fingerprint to determine a match between said information and said whole fingerprint information.

41. A system as in claim 36 wherein said first generator produces said constantly varying value based on an indicia of current time.

42. A system as in claim 41 wherein said current time includes current time of day.

43. A system as in claim 41 wherein said current time includes date.

44. The system as in claim 41 further comprising a real-time clock, which produces a stamp indicative of current time.

45. A system as in claim 41, further comprising, at a remote end, a receiver including a database having information indicative of the fingerprint and which compares said information with said data.

46. A system as in claim 45 wherein said receiver also includes a real-time clock.

47. A system as in claim 46, further comprising an element at said receiver which determines said constantly varying value, determines an indicia of time from said constantly varying value, and compares said indicia of time with a current time from said real clock to determine correspondence therebetween.

48. The system as in claim 47 wherein said clock is determined to be correct if the indicias of time agree within ten minutes.

49. A system as in claim 41 wherein said indicia of current time is based on an Internet based time standard.

50. A method of identification, comprising:
  storing, at a first location, a database including a plurality of biometric information parts;
  obtaining, at a second location, a biometric information part;
  determining a constantly changing value, and using said constantly changing value to sample and obtain a plurality separated values indicative of said biometric information part to be identified, wherein said values are separated by an amount based on said constantly changing value; and
  sending said separated values, but not sending values indicative of areas between said separated values to said first location and using said separated values at said first location to compare said biometric information part to information in said database.

51. A method as in claim 50, wherein said constantly changing value is a random value from a random value generator.

52. A method as in claim 51 wherein said biometric information part is a fingerprint.

53. A method as in claim 51 wherein said biometric information part is a retina.

54. A method as in claim 51, wherein said biometric information part produces biometric information of a form, which can be represented as an image.

55. A method as in claim 54, wherein said separated values are portions of the image, which are separated from one another.

56. A method as in claim 55 further comprising, prior to said sending, encrypting said information using an encryption scheme.

57. A method, comprising:
  receiving a signal which includes plural samples of biometric information, said plural samples including separated parts of a continuous stream of biometric information, which separated parts are separated by a separation amount; and
  comparing said samples to information in a database, which information represents an entirety of the biometric information, to determine whether or not the information matches the information in the database.

58. A method as in claim 57, further comprising comparing said samples to other samples which have been sent to determine if said samples and said other samples are the same, and producing an indication if said samples are the same.

59. A method as in claim 57 further comprising receiving clock information within said samples, and comparing said clock information to local time.

60. A method as in claim 59, wherein said receiving clock information comprises comparing clock information within a signal from a local real-time clock.

61. A method as in claim 57, wherein said biometric information is fingerprint information.

62. A method as in claim 61, wherein said samples are samples along lines of said fingerprint, which are spaced by a specified random amount.

63. A method as in claimed 57 further comprising adjusting an orientation of the biometric information, prior to said comparing.

64. A method as in claimed 61, further comprising adjusting an orientation of the fingerprint, prior to said comparing.

65. A method as in claim 64, wherein said adjusting an orientation comprises rotating the orientation of the fingerprint.

66. A method as in claim 57, wherein said biometric information is a retinal scan.

67. A method of transmitting biometric information, comprising:
  obtaining a biometric feature which can be represented as an image;
  obtaining a number which is effectively random;
  using said number to form separated samples of the image representing the biometric feature; and
  sending only said separated samples, and not the entire image, to a remote location.

68. A method as in claim 67, further comprising, at the remote location, comparing said separated samples with a database including an image of the entire biometric feature, and establishing a match based on said comparing.

69. A method as in claim 67 wherein said obtaining a number which is effectively random comprises using at least one of date and/or time of day to form a random number.

70. A method comprising:
  obtaining a signal indicative of a sample indicative of a part of a user's body;
  altering said signal to form a second sample which forms a constantly-changing personal access code which is representative of only a portion of said sample.

71. A method as in claim 70, wherein said part of the user's body includes a fingerprint.

72. A method as in claim 70, further comprising adding a timestamp indicating a time of said obtaining.

73. A method as in claim 70, further comprising encrypting said constantly changing personal access code.

74. A method as in claim 73, further comprising using said constantly changing personal access code to verify a transaction remotely.

75. A method as in claim 70, wherein said altering comprises taking only part of said sample and sending only said part according to a segmentation of data that represents said sample.

76. A method as in claim 71, further comprising obtaining an image of said fingerprint, selecting a segmentation pitch, and segmenting said image according to said segmentation pitch, said constantly changing access code representing portions of the signal obtained from said segmentation pitch.

77. A method as in claim 76, further comprising obtaining an indication of a current time, and using said indication to carry out said segmentation.

78. A method as in claim 77, wherein said indication represents a day.

79. A method as in claim 77, wherein said indication represents an hour and/or minute of the day.

80. A method as in claim 70, wherein said obtaining a sample comprises obtaining a sample of a whole of a part of the users body, and said altering comprises selectively reading out only part of said sample.

81. A method as in claim 74, wherein said the transaction is carried out over a phone line.

82. A method, comprising:
obtaining biometric information, indicative of a biometric part;
segmenting said biometric information in a way which is effectively random; and
forming a signal representing only segmented parts of the biometric information, and not the whole biometric information.

83. A method as in claim 82, wherein said segmenting comprises forming an image indicative of the biometric part, and selecting only specific parts of the image based on specified segmentation information.

84. A method as in claim 83, wherein said specified segmentation information is based on clock data.

85. A method as in claim 84, wherein said clock data includes both date and time.

86. A method as in claim 83, wherein said clock data includes data received over a network.

87. A method as in claim 82, wherein said obtaining comprises obtaining information indicative of the whole biometric part, and said segmenting comprises reading out only part of said information based on the specified criteria.

88. A method as in claim 87, wherein said information is a type of information, which can be represented as an image.

89. A method as in claim 88, wherein said information includes fingerprint information.

90. A method as in claim 82, further comprising encrypting said signal.

91. A method as in claim 90, further comprising using said signal to verify a remote transaction.

92. A method as in claim 82, wherein said segmenting is based on clock data.

93. A method as in claim 92, further comprising using said signal to verify a remote transaction, wherein said signal is verified by comparing said clock data to local clock data.

94. A method, comprising:
obtaining biometric information indicative of a biometric part;
adding information indicative of clock data to said biometric information;
encrypting a message including said clock data information, and said information indicative of the biometric part; and
verifying said information, by decrypting the message, and comparing the clock data information to local clock data information.

95. A method as in claim 94, wherein said verifying establishes a message as being accepted if said clock data information agrees with said local clock information by a predetermined threshold.

96. A method as in claim 95, wherein said predetermined threshold is a specified number of minutes.

97. A method as in claim 95, further comprising, if said clock data does not agree with said local clock information, sending a message indicating that clock data should be calibrated.

98. A method as in claim 94, wherein said clock data is data based on an Internet based time standard.

99. A method, comprising:
obtaining biometric information which can be represented as an image;
sending only part of said biometric information to a remote receiver; and
using said only part of said information to compensate for tilt of said image as part of verifying said biometric information.

100. A method as in claim 99, further comprising extracting specified angles from said biometric information, and wherein said compensate for tilt comprises determining if all angles are in error by a specified amount.

101. A method as in claim 100, wherein said biometric information is a fingerprint.

102. A method as in claim 101, wherein said specified angles include angles of features of said fingerprint.

103. A method as in claim 99, wherein said sending comprises encrypting said only part of said biometric information prior to said sending.

104. A method as in claim 103, wherein said encrypting comprises using clock data as part of the message prior to said encrypting.

105. A method as in claim 99, wherein obtaining comprises obtaining an entire sample of biometric information, and said sending only part comprises taking only part of said sample.

106. A method as in claim 105, wherein said taking only part comprises determining a value which is effectively random, and using said value to determine which part of said sample to take.

107. A method as in claim 106, wherein said value, which is effectively random, is based on clock data.

108. A method as in claim 106, further comprising processing said value which is effectively random to determine if said value has been previously used within a specified time.

109. A method, comprising:
obtaining biometric information;
obtaining a value which is effectively random;
determining if said value which is effectively random has been used for other samples within a specified time;
if said value has been used for other samples within the specified time, then selecting a new value; and
using said value to process said biometric information.

110. A method as in claim 109, wherein said using said value to process comprises using said value to select a portion of said biometric information.

111. A method as in claim 109, wherein said portion comprises separated segmented portions.

112. A method as in claim 109, wherein said biometric information is information, which can be represented as an image.

113. A method as in claim 112, wherein said portion comprises separated segmented portions of said image along specified parts of said image.

114. A method as in claim 112, wherein said biometric information includes fingerprint information.

115. A method as in claim 114, wherein said processing of said biometric information comprises determining angles of said fingerprint at specified portions based on said value.

116. A method comprising:
obtaining biometric information;
obtaining an indication of time from a network;
selecting only at part of said biometric information based on a value which is effectively random;
combining said only part, and said indication of time into a message;
encrypting said message; and
using said message to verify a transaction.

117. A method as in claim 116, wherein said message is used to verify the transaction over the network.

* * * * *